Jan. 6, 1925.
P. W. JOHNSON
TEAT CUP
Filed March 10, 1922
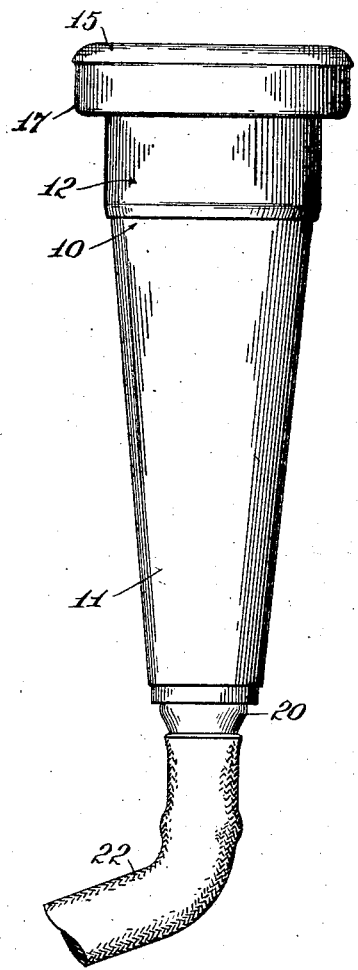
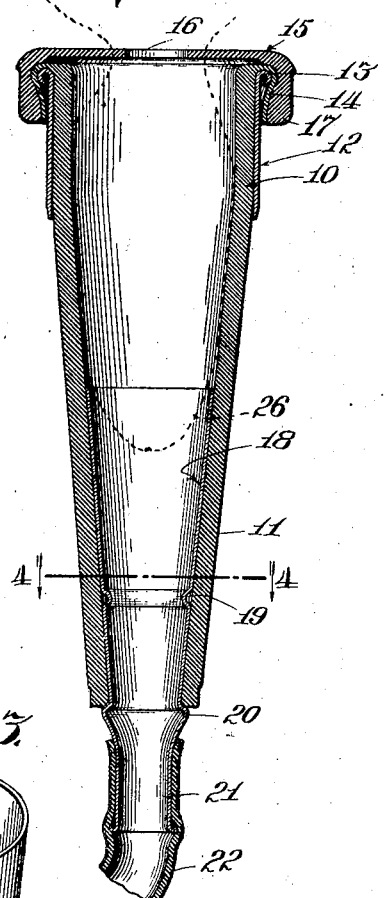
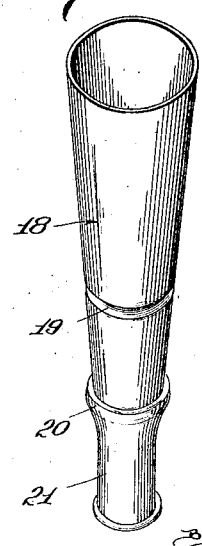
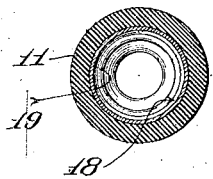
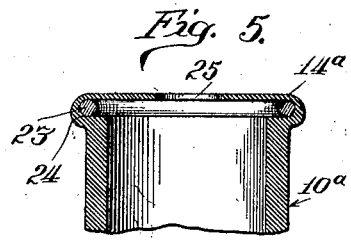

Patented Jan. 6, 1925.

1,521,887

UNITED STATES PATENT OFFICE.

PONTUS W. JOHNSON, OF ARLINGTON HEIGHTS, ILLINOIS.

TEAT CUP.

Application filed March 10, 1922. Serial No. 542,799.

*To all whom it may concern:*

Be it known that I, PONTUS W. JOHNSON, a citizen of the United States, residing at Arlington Heights, in the county of Cook and State of Illinois, have invented certain new and useful Improvements in Teat Cups, of which the following is a specification.

My invention relates to a teat cup for milking machines of the vacuum type, and the principal object of the invention is to provide a novel and improved form of teat cup which operates through the vacuum created within the cup to squeeze the teat the same time that milk is being withdrawn from the same by suction.

A further object is to so construct the cup as to prevent the lower portion thereof (teat cups of this sort usually tapering to a diameter substantially that of the milk pipe or tube to which they are attached) from being constricted by the suction, especially on a short teat, so as to shut off or obstruct the outflow of milk.

A further object is to provide a teat cup of such construction that it may readily be taken apart for cleaning and the parts as readily re-assembled.

The invention is illustrated, in a preferred embodiment, in the accompanying drawing in which—

Fig. 1 is a side view of a teat cup.

Fig. 2 is a longitudinal sectional view of the same.

Fig. 3 is a view, in perspective, of the member for rigidifying the lower end of the cup.

Fig. 4 is a sectional view on line 4—4 of Fig. 2; and

Fig. 5 is a fragmentary sectional view of a modified construction of the upper part of the cup.

Referring to the drawing, the teat cup is preferably composed of the following elements: 10 is a flexible cup member, preferably composed of relatively soft rubber, the lower portion 11 of which is tapered toward the bottom. 12 is a metal ring provided at its upper edge with a bead 13. The cup member 10 is formed with a lip 14 which is preferably thinner than the body of this member and is adapted to extend over bead 13 so as to take a binding hold against the metal ring 12. 15 is a rubber diaphragm formed with a central opening 16 and with a flange or rib 17 to extend around lip 14 and bead 13, the diaphragm being preferably made so that flange 17 has to be stretched in order to apply the diaphragm to the cup. In the lower tapered end 11 of the flexible member 10 is arranged a rigid, preferably metal member 18 having substantially the contour and internal dimensions of the lower portion of the flexible member, the rigid member extending, preferably, approximately half way up the flexible member and having a rather tight fit therein. To prevent slipping the rigid member is formed with a groove 19 and a circumferential shoulder 20. The member 18 extends below the flexible member 11, 12 to provide a nipple 21 for the flexible tube 22 which conveys the milk to the milking machine.

As shown in Fig. 5, the diaphragm 15 may be omitted and a ring 23 inserted under the flange 14$^a$ of the flexible cup member 10$^a$, which flange, in this case, is not turned back over the edge of the cup. The ring 12 is omitted and ring 23 sealed in the recess 24 between the upper edge of the cup and the flange. The opening 25 will be of appropriate size for the teat of the cow.

Operation: The cup is fitted on the teat which is indicated in dotted lines at 26. When the air is exhausted from the cup through operation of the milking machine, the upper portion of the flexible member, that is to say, the portion above the upper edge of the rigid cup 18 is drawn inwardly against the cow's teat so as to exert a certain amount of pressure against the same simultaneously with the application of suction to the teat. This is particularly advantageous in the last few milking strokes as it brings about a stripping which, in the case of most milking machines, has to be performed by hand. The metal cup member 18 prevents any constriction of the lower tapered end of the cup. If such constriction took place, particularly if the teat were a small one, it would tend to prevent or obstruct the outflow of milk from the device.

I claim:

1. In a teat cup, the combination of a rigid ring, a flexible cup member extending through and attached to the ring with its lower end tapered, and a rigid tapered cup member within the lower end of the flexible cup member.

2. In a teat cup, the combination of a rigid ring, a flexible cup member extending through and attached to the ring with its lower end tapered, and a rigid tapered cup member within the lower end of the flexible cup member and extending approximately half way up the same.

3. In a teat cup, the combination of a ring formed at its upper edge with a bead, a flexible cup member having a lip thinner than the body thereof to extend around said bead, a flexible, centrally perforated diaphragm having a flange to extend around and take a binding hold on said lip and bead, the lower end of the cup being tapered, and a tapered, rigid cup within the lower part of the flexible member.

4. In a teat cup, the combination of a flexible cup member having a lip thinner than the body thereof, which projects inwardly forming a diaphragm to engage the teat and providing an interior recess, a metal ring located in said recess and a rigid cup within the lower part of the flexible cup.

5. A teat cup of flexible material having a member in its upper end effective to maintain the shape thereof, and an imperforate member inserted in the lower end of said cup and extending not more than half way of the length of the same for preventing collapse of said cup throughout the lower portion thereof, the portion of the cup between said upper and lower members being subject to bodily movement under suction.

6. A teat cup of flexible material circular in cross section and converging from top to bottom, and means in the lower end of said cup for making the same rigid, said means being adapted to prevent movement of the whole of that portion of the cup under suction, while permitting total collapse of the intermediate portion of the cup.

7. A teat cup having a portion of its length unsupported against collapse for engaging the teat, and means within said cup in that portion of the cup which is out of contact with the teat for preventing collapse of that portion of the cup under suction.

8. A teat cup having a portion of its length circumferentially subject to collapse under suction, and another portion prevented from collapse, said latter portion being adapted for connection to a conduit.

PONTUS W. JOHNSON,